M. P. FUGATE.
ANIMAL TRAP.
APPLICATION FILED AUG. 19, 1912.
1,107,775.
Patented Aug. 18, 1914.
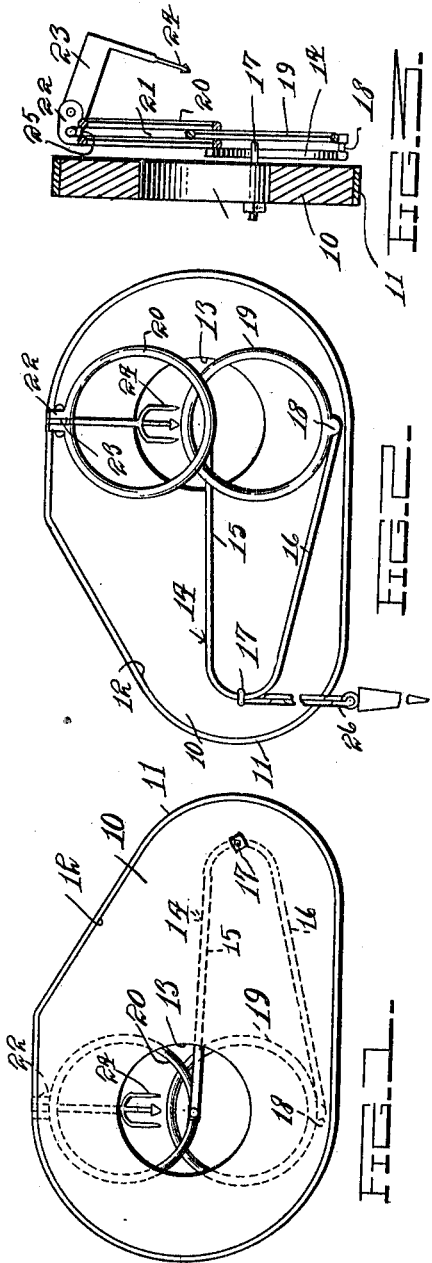
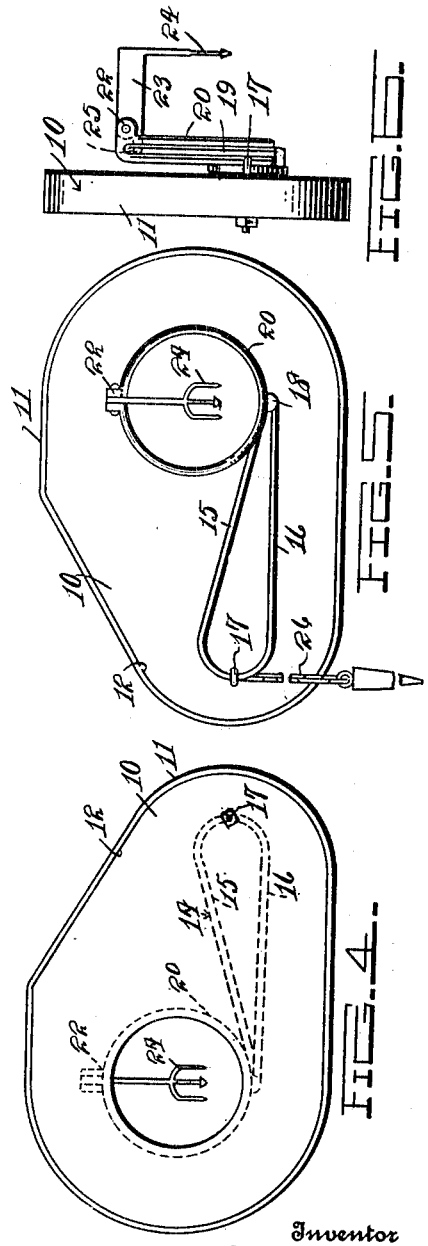
Witnesses
P. H. Taylor
J. Bunch
Inventor
M. P. Fugate
By Randall Chandler
Attorneys

UNITED STATES PATENT OFFICE.

MORGAN P. FUGATE, OF DEWEY, OKLAHOMA.

ANIMAL-TRAP.

1,107,775.   Specification of Letters Patent.   Patented Aug. 18, 1914.

Application filed August 19, 1912. Serial No. 715,884.

*To all whom it may concern:*

Be it known that I, MORGAN P. FUGATE, a citizen of the United States, residing at Dewey, in the county of Washington, State of Oklahoma, have invented certain new and useful Improvements in Animal-Traps; and I do hereby declare the following to be a full, clear, and exact description of the invention, such as will enable others skilled in the art to which it appertains to make and use the same.

This invention relates to certain new and useful improvements in animal traps and more particularly to that type adapted to be placed over the entrance hole of an animal whereby an attempt to secure the bait will result in the catching of the animal between a pair of oppositely movable jaws upon releasing the latter.

The essential object of the invention is evolved in the provision of a trap which comprises a supporting board having an opening through which the animal may project its head, the board being supported in a vertical position on its edge and carrying a pair of clamping rings normally held in alinement by means of a bait holding catch which is released upon an attempt to secure the bait so that the rings will spring apart quickly and catch the animal between the overlapped portions without mutilation.

With the above and other objects in view, the invention consists of certain constructions, combinations and arrangements of parts as will be hereinafter more fully described, claimed and illustrated in the accompanying drawings, in which:

Figure 1 is a front view of the trap when sprung. Fig. 2 is a rear view of the trap when sprung. Fig. 3 is a vertical sectional view of the trap in the same position and with the clamping parts in elevation. Fig. 4 is a front view of the trap when set. Fig. 5 is a rear view of the tray when set. Fig. 6 is an end elevation thereof.

As illustrated, my improved trap embodies a board 10 forming the body of the trap and which is provided with an iron or metallic rim 11. As illustrated, the board is of substantially elliptical form except that it is provided with one inclined edge 12 and has its enlarged portion provided with a central circular opening 13 which in practice is positioned over an animal hole whereby the animal may project his head therethrough.

Secured to the front face of the board near its reduced end is a substantially V-shaped expansion spring 14, the arms 15 and 16 of which are normally expanded while the bight portion of the spring is anchored to the body or board by a bolt as indicated at 17. The lower arm 16 carries on its free extremity through the medium of a lug 18, an offset ring or circular clamping jaw 19 which is normally held in a lowered position substantially overlying one-half of the opening 13 at its upper portion and adapted to engage between the lower portions of an upper circular jaw or ring 20 having a central bifurcation 21 dividing it longitudinally into two parts from a point near its upper end.

The upper jaw is normally held in a raised position and is secured at its lower end to the free extremity of the arm 15 to normally overlie the upper half of the opening while the upper end is formed with a forwardly projected fulcrum or bifurcated lug 22 pivotally receiving a trigger arm 23 formed at its outer end with a depending bait fork 24 for the suspension of the bait in the manner disclosed in Fig. 6 of the drawings near the bottom of the opening and with the fork disposed in parallel relation to the body. The inner end of the arm 23 is provided with a projection 25 adapted when the arms of the spring are compressed or moved toward each other, to hold the lower jaw in alinement with the upper part as is also disclosed in Fig. 6 of the drawings and to permit expansion of the arms by disengagement of the projection or shoulder from beneath the inner face of the lower jaw upon the forcing up of the bait hook in an attempt of the animal to obtain the bait whereby the animal will fall between the overlapped portions of the jaws.

From the foregoing description, it will be seen that I have provided an animal trap which involves a few simple parts providing a strong and durable structure and which will be instantly operated to release the jaws in an attempt of the animal to secure the bait and thereby prevent the animal from throwing the trap without getting caught. An anchoring chain 26 is also provided for the trap and secured to the bolt 17 to prevent the animal from carrying the trap off.

I claim:

A trap including a supporting member having a circular opening therethrough, a

V-shaped leaf spring secured at the bight on one face of said support, a pair of rings of like diameter with each other and with said opening, one ring being secured to the end of a corresponding leg of said spring, and comprising a pair of spaced annuli receiving therebetween the other ring, the remaining leg of said spring being secured to the lower bifurcation of the last mentioned annulus and being arranged on the same side of the last mentioned annulus as the first leg of the spring on the first annulus whereby said legs lie close together when the trap is set, and both rings being adapted to register one with the other and with said opening upon placing of said spring under tension, a forwardly directed bifurcated lug carried by the upper ring, and a rightangular bait receiving trigger pivoted at the rear end in said lug and having a projection disposed below and in rear of its pivot forming a catch to engage with and hold the lower ring in cocked position with respect to the upper ring and said opening.

In testimony whereof, I affix my signature, in presence of two witnesses.

MORGAN P. FUGATE.

Witnesses:
C. C. CAGLE,
CARL LEWIS.

Copies of this patent may be obtained for five cents each, by addressing the "Commissioner of Patents, Washington, D. C."